United States Patent
Naik et al.

(10) Patent No.: US 8,083,016 B2
(45) Date of Patent: Dec. 27, 2011

(54) VEHICLE WITH HYBRID POWERTRAIN

(75) Inventors: Sanjeev M. Naik, Troy, MI (US); Balarama V. Murty, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 12/422,374

(22) Filed: Apr. 13, 2009

(65) Prior Publication Data

US 2010/0258370 A1 Oct. 14, 2010

(51) Int. Cl.
 *B60K 6/42* (2007.10)
 *B60K 6/50* (2007.10)
 *F16H 37/06* (2006.01)

(52) U.S. Cl. ........... 180/65.23; 180/65.235; 180/65.265; 180/65.31; 180/65.6; 180/242; 475/5; 477/3

(58) Field of Classification Search ............... 180/65.22, 180/65.23, 65.235, 65.31, 242, 243, 65.225, 180/65.265, 65.6; 475/5, 6; 477/3, 5
See application file for complete search history.

(56) References Cited

U.S. PATENT DOCUMENTS

| | | | | |
|---|---|---|---|---|
| 5,176,590 A * | 1/1993 | Haydock | | 475/249 |
| 5,209,707 A * | 5/1993 | Teraoka | | 475/249 |
| 5,547,433 A * | 8/1996 | Yang | | 477/5 |
| 5,562,566 A * | 10/1996 | Yang | | 477/3 |
| 5,643,119 A | 7/1997 | Yamaguchi et al. | | |
| 6,306,056 B1 * | 10/2001 | Moore | | 475/5 |
| RE37,743 E * | 6/2002 | Yang | | 477/3 |
| 6,402,656 B1 * | 6/2002 | Peralta | | 475/252 |
| 6,478,705 B1 * | 11/2002 | Holmes et al. | | 475/5 |
| 6,830,530 B2 * | 12/2004 | Perkins et al. | | 475/231 |
| 7,140,461 B2 * | 11/2006 | Morrow | | 180/65.245 |
| 7,464,780 B2 * | 12/2008 | Masterson et al. | | 180/65.31 |
| 2004/0058774 A1 * | 3/2004 | Perkins et al. | | 475/248 |
| 2006/0048982 A1 * | 3/2006 | Yamamoto et al. | | 180/65.2 |
| 2006/0070779 A1 * | 4/2006 | Kuang et al. | | 180/65.2 |
| 2009/0005215 A1 * | 1/2009 | Silveri et al. | | 477/5 |
| 2010/0186408 A1 * | 7/2010 | Rose et al. | | 60/629 |

OTHER PUBLICATIONS

Miller, An Assessment of Ultra-capacitors as the Power Cache in Toyota THS-II, GM-Allison AHS-2 and Ford FHS Hybrid Propulsion Systems, Applied Power Electronics Conference and Exposition, Twentieth Annual IEEE, Mar. 2005, pp. 481-490, vol. 1, IEEE, United States.

* cited by examiner

*Primary Examiner* — Joseph Rocca

(74) *Attorney, Agent, or Firm* — Quinn Law Group, PLLC

(57) ABSTRACT

A hybrid vehicle is provided with an engine, as well as a transmission having a motor/generator, a stationary member, and a planetary gear set. The engine and the motor/generator are separately selectively connectable to one of the drive axle assemblies by engagement of different ones of the torque-transmitting mechanism to transfer torque to that drive axle assembly. One or both of the engine and the motor/generator is also selectively connectable to the other drive axle assembly by engagement of another one of the torque-transmitting mechanisms to transfer torque to the other of drive axle assembly.

19 Claims, 5 Drawing Sheets

| MODE | 50 | 52 | 54 | 56 | 58 | |
|---|---|---|---|---|---|---|
| E-LAUNCH / ZEV MODE | 0 | 0 | 0 | 0 | 1 | Rear electric drive |
| ACCELERATING | 1 | 0 | 1 | 0 | 0 | Front drive - E & M/G |
| CRUISE$_{LOSPD,F}$ | 1 | 0 | 0/1 | 1/0 | 0 | E or E & M/G |
| CRUISE$_{HISPD,F}$ | 1 | 0 | 0 | 1 | 0 | Engine Only |
| BRAKING$_F$ | 0/1 | 1/0 | 1 | 0 | 0 | Front axle regeneration |
| BRAKING$_R$ | 0/1 | 1/0 | 0 | 0 | 1 | Rear axle regeneration |

Engaged Clutch = 1     Disengaged Clutch = 0

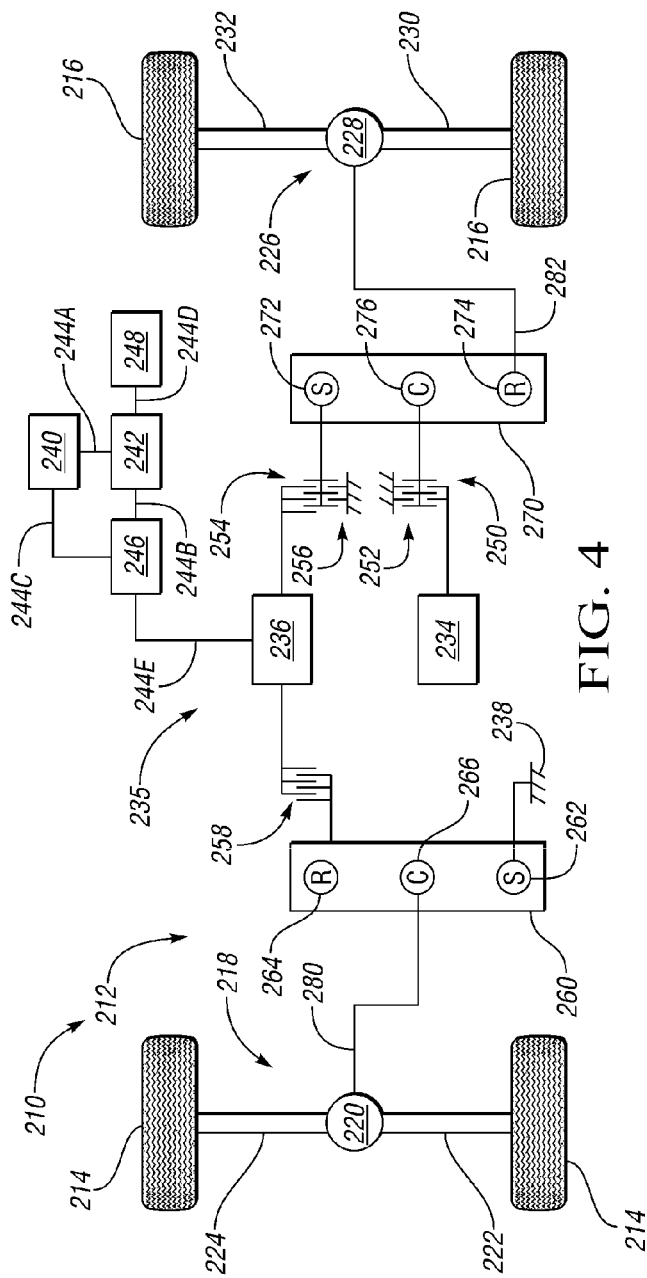

| MODE | 352 | 350 | 353 | 356 | (358, 354, 357, 359) |
|---|---|---|---|---|---|
| E-LAUNCH | 0 | 0 | 0 | 1 | (0, 1, 0, 0) |
| BRAKING | 1 | 0 | 0 | 0 | (1, 0, 0, 0) |
| CRUISE$_{LOSPD,F}$ | 0 | 1 | 0 | 0 | (1, 0, 0, 0) |
| CRUISE$_{LOSPD,R}$ | 0 | 0 | 1 | 0 | (0, 1, 0, 0) |
| CRUISE$_{HISPD,F}$ | 0 | 1 | 0 | 0 | (0, 0, 1, 0) |
| CRUISE$_{HISPD,R}$ | 0 | 0 | 1 | 0 | (0, 0, 0, 1) |

Engaged Clutch = 1    Disengaged Clutch = 0

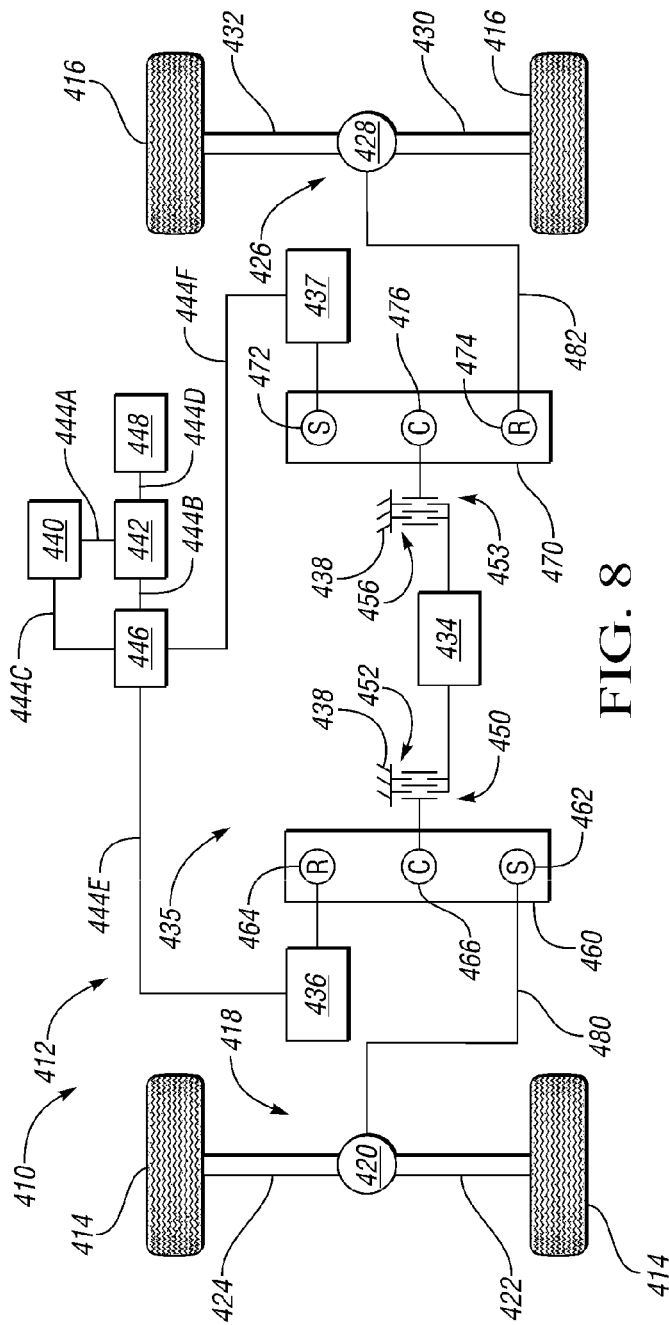

VEHICLE WITH HYBRID POWERTRAIN

TECHNICAL FIELD

The invention relates to a hybrid powertrain on a vehicle with an engine and a motor/generator.

BACKGROUND OF THE INVENTION

Automotive hybrid powertrains typically have an engine and one or more motor/generators interconnected by transmission gearing and selectively engagable torque-transmitting mechanisms controlled to provide various vehicle operating modes, such as one or more electrically-variable modes of operation, fixed speed ratio modes, and an electric-only (battery-powered) mode. Hybrid powertrains may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

SUMMARY OF THE INVENTION

There is a need for hybrid powertrains that offer the fuel economy benefits of various operating modes while containing overall cost by minimizing the number of required components and/or by providing design flexibility for a variety of vehicle platforms by scaling component size or capacity. A hybrid vehicle is provided with an engine, as well as a transmission having a motor/generator, a stationary member, and a planetary gear set. The planetary gear set has a ring gear member, a sun gear member, and a carrier member. At least one of the members of the planetary gear set is connected to either a front axle assembly, in turn connected with front wheels, or a rear axle assembly, connected with rear wheels. The transmission includes a plurality of selectively engagable torque-transmitting mechanisms, such as rotating-type clutches and stationary-type clutches, also referred to as brakes. The engine and the motor/generator are separately selectively connectable to one of the drive axle assemblies by engagement of different ones of the torque-transmitting mechanisms to transfer torque to the drive axle assembly. One or both of the engine and the motor/generator is also selectively connectable to the other drive axle assembly by engagement of another one of the torque-transmitting mechanisms to transfer torque to the other drive axle assembly.

Especially in embodiments with only a single motor/generator, cost reductions may be achieved due to the reduced number of motor/generators and power electronics (e.g., only one power inverter, etc.). Because at least one of the torque-producing components (i.e., the engine or the motor/generator) is selectively connectable with the front axle assembly in some modes and the rear axle assembly in other modes, similar performance and operating modes are provided that heretofore have been available only with more complex, and, therefore, higher cost hybrid powertrains (e.g., powertrains with more components, such as two motor/generators, a separate set of power switches for each motor/generator, etc.). Previous designs also restrict drive torque to only one of the axle assemblies.

The engine, the motor generator(s), and the gear ratios of the planetary gear set(s) may be scaled for performance requirements of different vehicle platforms. In some embodiments, two motor/generators and/or two planetary gear sets are included, allowing additional operating modes.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic illustration of a second embodiment of a hybrid vehicle with a second embodiment of a hybrid powertrain;

FIG. 5 is a table indicating the engagement status of torque-transmitting mechanisms in the powertrain of FIG. 4 in various operating modes;

FIG. 8 is a schematic illustration of a fourth embodiment of a hybrid vehicle with a fourth embodiment of a hybrid powertrain; and FIG. 9 is a table indicating the engagement status of torque-transmitting mechanisms in the powertrain of FIG. 8 in various operating modes.

DESCRIPTION OF THE PREFERRED EMBODIMENTS

Figures 1, 2:
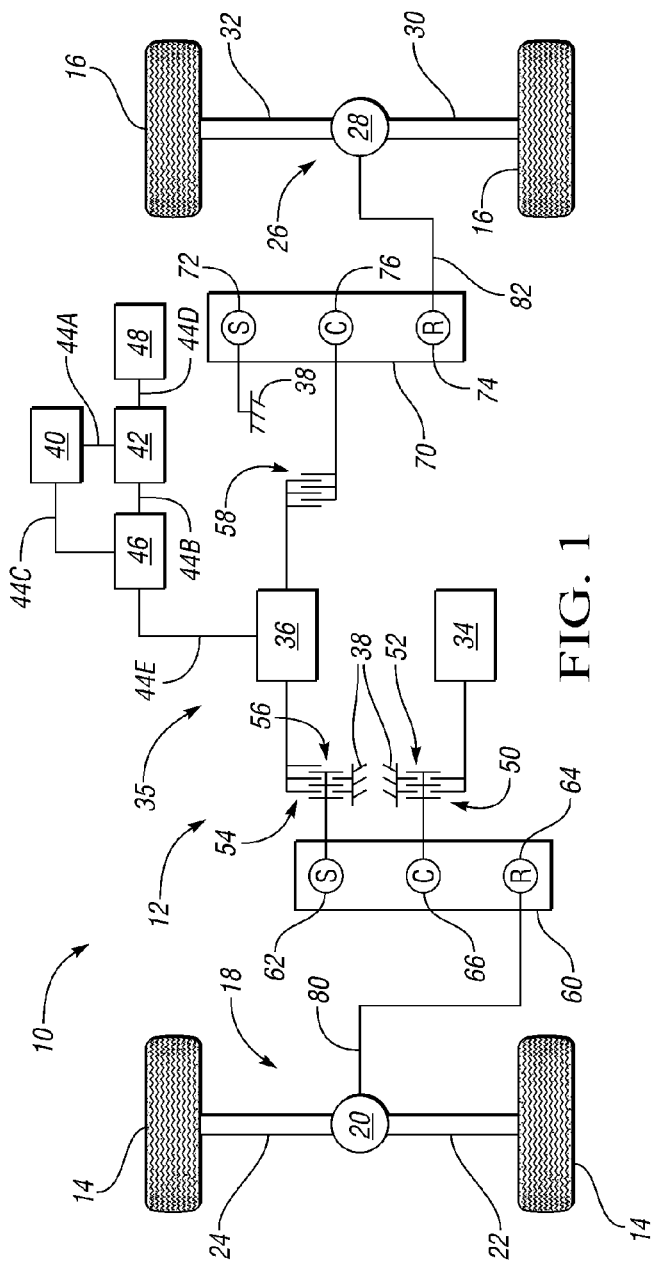
FIG. 1 is a schematic illustration of a first embodiment of a hybrid vehicle with a first embodiment of a hybrid powertrain.
FIG. 2 is a table indicating the engagement status of torque-transmitting mechanisms in the powertrain of FIG. 1 in various operating modes.

Referring to the drawings, wherein like reference numbers refer to like components throughout the several views, FIG. 1 shows a hybrid vehicle 10 having a hybrid powertrain 12 for delivering power to front wheels 14 and rear wheels 16 of the vehicle 10, as described herein. The vehicle 10 has a front axle assembly 18 including a differential 20 connected with first and second front axles 22, 24 that are each attached with a respective one of the wheels 14. Similarly, the vehicle has a rear axle assembly 26 including a differential 28 connected with first and second rear axles 30, 32 that are each attached with a respective one of the wheels 16.

The powertrain 12 includes an engine 34, such as an internal combustion or diesel engine, as well as a transmission 35 that includes a single motor/generator 36. The motor/generator 36 is represented schematically, and includes a stator portion as well as a rotor portion. The stator portion is grounded to a stationary member, such as a casing 38 of the transmission 35. The casing 38 is shown only in fragmented form attached with various torque-transmitting mechanisms, discussed below. The rotor portion is selectively connectable to the planetary gear sets 60, 70, as described below. Those skilled in the art will readily understand the construction and function of stators and rotors.

The transmission 35 selectively receives torque from the engine 34. The hybrid transmission 35 also receives torque from the motor/generator 36, which in turn is powered by an electric storage device 40. If the motor/generator 36 is controlled to function as a generator, torque from the transmission 35 is converted to electric energy stored in the electric storage device 40. The electric storage device 40 may be one or more batteries but will be referred to herein as a battery. Other electric storage devices that have the ability to store electric power and dispense electric power may be used in place of the batteries.

The electric storage device 40 communicates with an electronic controller 42 by transfer conductor 44A. The controller 42 communicates with a power inverter 46 by transfer conductor 44B. The power inverter 46 in turn communicates with the electric storage device 40 via transfer conductor 44C. Transfer conductor 44E allows the power inverter 46 to provide the stored electric power to the motor/generator 36 in a motor mode, or transfer electric power from the motor/generator 36 to the electric storage device 40 in a generator mode. Additionally, the controller 42 communicates with a valve body 48 via transfer conductor 44D to control selective engagement or disengagement of torque transmitting devices 50, 52, 54, 56 and 58, described below, via hydraulic fluid pressure, as is understood by those skilled in the art. Selective engagement of the torque-transmitting mechanisms 50, 52, 54, 56 and 58 along with control of the speed and torque of the motor/generator 36 and engine 34 determines the operating mode of the powertrain 12.

Sensors, not shown, may be operatively connected with the torque transmitting mechanisms 50, 52, 54, 56, 58, as well as the engine 34 and the motor/generator 36 to provide, via transfer conductor not shown, sensed characteristics to the controller 42, such as temperature, torque load and relative speed of clutch plates.

The powertrain 12 further includes a first planetary gear set 60 and a second planetary gear set 70. The first planetary gear set 60 is a simple planetary gear set, shown in a lever and node form well understood by those skilled in the art, and includes a sun gear member 62, also represented with an S, a ring gear member 64, also represented with an R, and a carrier member 66, also represented with a C, that rotatably supports pinion gears intermeshing with both the sun gear member 62 and the ring gear member 64. The sun gear member 62 is grounded to the stationary member 38 by engagement of the torque-transmitting mechanism 56, which is a stationary-type clutch, also referred to as a brake. The sun gear member 62 is connected for rotation with the rotor of the motor/generator 36 by engagement of the torque-transmitting mechanism 54, which is a rotating-type clutch. The carrier member 66 is connected for rotation with an output member of the engine 34 by engagement of torque-transmitting mechanism 50, which is a rotating-type clutch. The carrier member 66 is grounded to the stationary member 38 by engagement of torque transmitting mechanism 52, which is a stationary-type clutch, also referred to as a brake. The ring gear member 64 is continuously connected for rotation with a carrier of the differential 20 of the front axle assembly 18 via a connecting member 80, such as a propeller shaft. The front axles 22, 24 are connected with side gears of the differential 20 that mesh with a pinion supported for rotation on the differential carrier, as is typical of differentials and is understood by those skilled in the art. Other types of planetary gear sets, such as a compound planetary gear set, may be used in lieu of a simple planetary gear set 60, depending on the desired gear ratio between the motor/generator 36, engine 34 and front axle assembly 18.

The second planetary gear set 70 is a simple planetary gear set, also shown in the lever and node form well understood by those skilled in the art, and includes a sun gear member 72, also represented with an S, a ring gear member 74, also represented with an R, and a carrier member 76, also represented with a C, that rotatably supports pinion gears intermeshing with both the sun gear member 72 and the ring gear member 74. The sun gear member 72 is continuously grounded to the stationary member 38. The carrier member 76 is connected for rotation with the rotor of the motor/generator 36 by engagement of the torque-transmitting mechanism 58, which is a rotating-type clutch. The ring gear member 74 is continuously connected for rotation with a carrier of the differential 28 of the rear axle assembly 26 via a connecting member 82, such as a propeller shaft. The rear axles 30, 32 are connected with side gears of the differential 28 that mesh with a pinion supported for rotation on the differential carrier, as is typical of differentials and is understood by those skilled in the art.

In an alternative embodiment, there is no second planetary gear set 70, and the connecting member 82 connects directly with the rotor of motor/generator 36 by engagement of the torque-transmitting mechanism 58.

Referring to FIG. 2, the torque-transmitting mechanisms 50, 52, 54, 56 and 58 are engagable in different combinations, along with different operating states of the engine 34 (on or off mode) and motor/generator 36 (motor or generator mode) to provide various operating modes. First, the vehicle 10 may be launched in an electric-only mode (also referred to as E-Launch/ZEV (zero emissions) Mode, or as rear electric drive mode) by engaging torque-transmitting mechanism 58 and controlling the motor/generator 36 to function as a motor. The engine 34 is off in the electric-only mode. The motor/generator 36 thus provides torque to the rear wheels 16 through the planetary gear set 70 and rear axle assembly 26.

Figure 3:
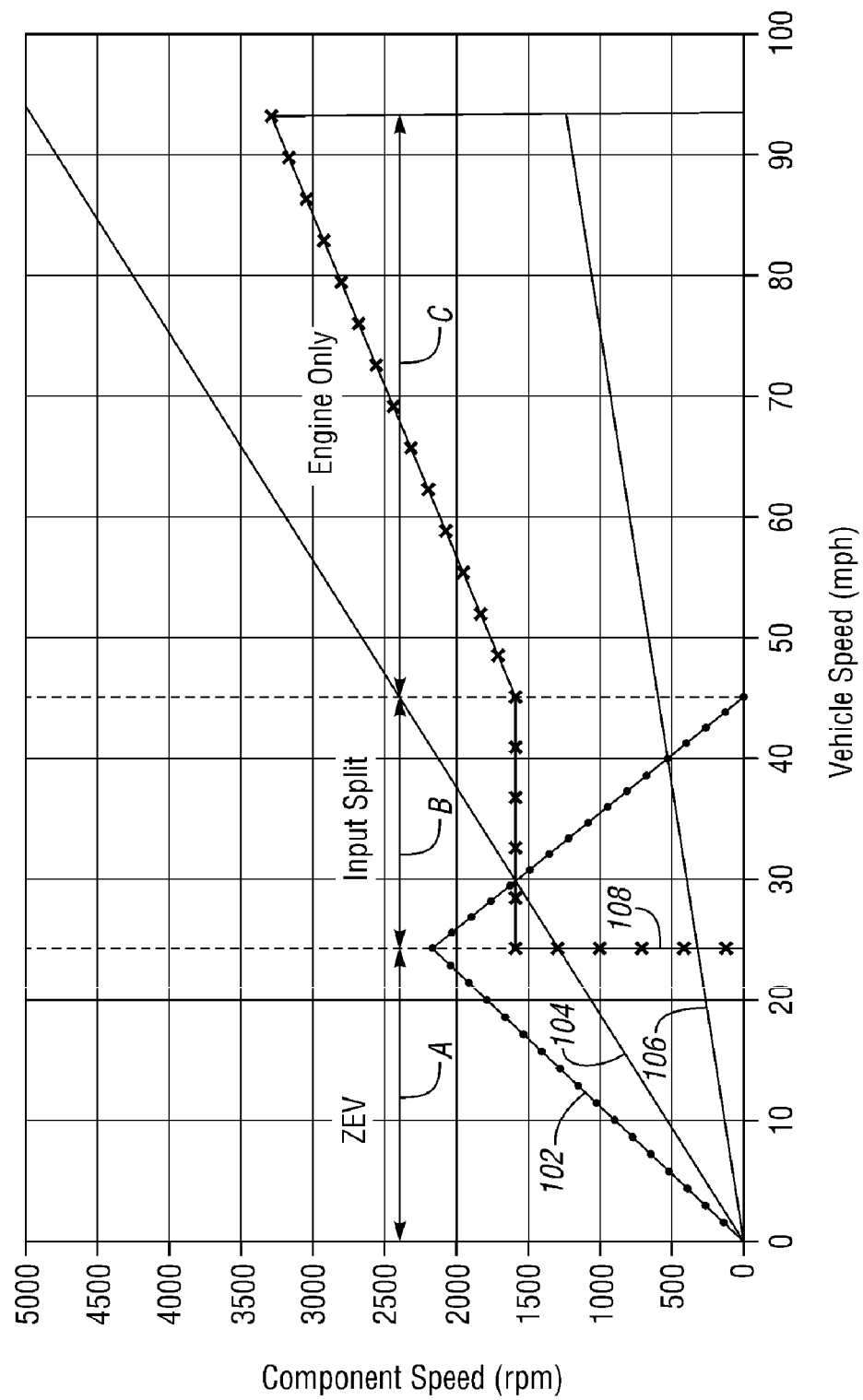
FIG. 3 is a plot of vehicle speed versus speeds of various components of the vehicle of FIG. 1.

Referring to FIG. 3, the electric-only mode is illustrated in the first region A of the plot when vehicle speeds are from 0 to 25 miles per hour. Component speeds in revolutions per minute (rpm) during the electric-only mode are represented by curve 102, showing the speed of the motor/generator 36 rising with vehicle speed throughout the mode. The speed of the connecting member 80 is represented by curve 104, also steadily rising with vehicle speed. The speed of the vehicle wheels 14, 16 is represented by curve 106, reduced relative to the connecting member speed 104 via the reduction ratio of the differential 20. Engine speed is 0 rpm during the entire electric-only mode, as the engine 34 remains disconnected from both axle assemblies 18, 26 during this mode.

Referring again to FIG. 2, the vehicle 10 may be shifted from the electric-only mode to an input-split operating mode by engaging torque-transmitting mechanisms 50 and 54 while simultaneously disengaging torque-transmitting mechanism 58. In the input-split operating mode, which is front-drive, when accelerating, the engine 34 provides torque to the carrier member 66, and the motor/generator 36 is controlled to function as a motor to provide torque to the sun gear member 62 or function as a generator.

As can be seen in the plot of FIG. 3, this shift occurs at about 25 mph, at which curve 108 indicates that the engine speed comes on at a constant 1600 rpm, representing the optimal operating speed for engine efficiency. The input-split mode is represented as Region B in FIG. 3. Engine speed remains constant throughout the input-split mode, which extends from 25 mph to approximately 45 mph, representing a significant portion of typical driving speeds. At the shift point, there is no change in the motor/generator speed, as represented by the apex of curve 102.

To cruise at a constant, relatively low vehicle speed, (e.g., between 25 and 45 mph), referred to as CRUISE$_{LOSPD,F}$ in FIG. 2, the controller 42 monitors speed of wheels 14, 16, and operates either in the input-split mode or in an engine-only mode. In the input-split mode, when cruising, the torque-transmitting mechanisms 50 and 54 are engaged, and the motor/generator 36 is controlled to function either as a motor or as a generator, to maintain a desired cruising speed, with the engine 34 able to operate at its most efficient speed. In the engine-only mode, torque-transmitting mechanism 50 and torque-transmitting mechanism 56 are engaged, to ground the sun gear member 62 to the stationary member 38, so that only the engine 34 is providing torque, and the motor/generator 36 is disconnected from both front and rear axle assemblies 18, 26.

To cruise at a constant, relatively high vehicle speed (e.g., above 45 mph), referred to as CRUISE$_{HISPD,F}$ in FIG. 2, torque-transmitting mechanism 50 remains engaged and the engine-only mode is established by also engaging torque-transmitting mechanism 56 while torque-transmitting mechanism 54 is disengaged. The engine-only mode is represented as Region C in the plot of FIG. 3. Engine speeds in this mode are greater than the optimally-efficient speed of the input-split mode. Speed of motor/generator 36 is zero, and the speed of the wheels 14, 16 and the front connecting member 80 increase proportionately with increasing engine speed.

Two regenerative braking modes are provided. For regeneration of front axle torque during front-drive modes, referred to as BRAKING$_F$ in FIG. 2, such as during the cruising modes, the torque-transmitting mechanism 54 is engaged to connect the connect the sun gear member 62 for rotation with the motor/generator 36, which is controlled to operate as a generator, converting torque at the sun gear member 62 to stored electrical energy in the energy storage device 40. Either, but not both, of torque-transmitting mechanisms 50 and 52 is engaged. If torque-transmitting mechanism 50 is engaged, engine torque is still provided to the carrier 66, and may be regenerated by the motor/generator 36 as energy stored in the electric storage device 40, to slow the wheels 14 via connecting member 80.

For regeneration of rear axle torque, referred to as BRAKING$_R$ in FIG. 2, such as during the electric-only, rear drive mode, either, but not both, of torque-transmitting mechanisms 50 and 52 is engaged as discussed above, torque-transmitting mechanism 58 is engaged, and the motor/generator 36 is controlled to function as a generator, converting torque of the rear axle assembly 26 provided at the ring gear member 74 to stored electrical energy in the energy storage device 40.

Second Embodiment

FIG. 4 shows a hybrid vehicle 210 having a hybrid powertrain 212 for delivering power to front wheels 214 and rear wheels 216 of the vehicle 210, as described herein. The vehicle 210 has a front axle assembly 218 including a differential 220 connected with first and second front axles 222, 224 that are each attached with a respective one of the wheels 214.

Similarly, the vehicle has a rear axle assembly 226 including a differential 228 connected with first and second rear axles 230, 232 that are each attached with a respective one of the wheels 216.

The powertrain 212 includes an engine 234, such as an internal combustion or diesel engine, as well as a transmission 235 that includes a single motor/generator 236. The motor/generator 236 is represented schematically, and includes a stator portion as well as a rotor portion. The stator portion is grounded to a stationary member, such as a casing 238 of the transmission 235. The casing 238 is shown only in fragmented form attached with various torque-transmitting mechanisms, discussed below. The rotor portion is selectively connectable to the planetary gear sets 260, 270, as described below. Those skilled in the art will readily understand the construction and function of stators and rotors.

The transmission 235 selectively receives torque from the engine 234. The motor/generator 236 may also provide torque, using electric power provided by an electric storage device 240. If the motor/generator 236 is controlled to function as a generator, torque from the transmission 235 is converted to electric energy stored in the electric storage device 240. The electric storage device 240 may be one or more batteries but will be referred to herein as a battery. Other electric storage devices that have the ability to store electric power and dispense electric power may be used in place of the batteries.

The electric storage device 240 communicates with an electronic controller 242 by transfer conductor 244A. The controller 242 communicates with a power inverter 246 by transfer conductor 244B. The power inverter 246 in turn communicates with the electric storage device 240 via transfer conductor 244C. Transfer conductor 244E allows the power inverter 246 to provide the stored electric power to the motor/generator 236 in a motor mode, or transfer electric power from the motor/generator 236 to the electric storage device 240 in a generator mode. Additionally, the controller 242 communicates with a valve body 248 via transfer conductor 244D to control selective engagement or disengagement of torque transmitting devices 250, 252, 254, 256 and 258, described below, via hydraulic fluid pressure, as is understood by those skilled in the art. Selective engagement of the torque-transmitting mechanisms 250, 252, 254, 256 and 258 along with control of the speed and torque of the motor/generator 236 and engine 234 determines the operating mode of the powertrain 212.

Sensors, not shown, may be operatively connected with the torque transmitting mechanisms 250, 252, 254, 256, 258, as well as the engine 234 and the motor/generator 236 to provide, via transfer conductor not shown, sensed characteristics to the controller 242, such as temperature, torque load and relative speed of clutch plates.

The powertrain 212 further includes a first planetary gear set 260 and a second planetary gear set 270. The first planetary gear set 260 is a simple planetary gear set, shown in a lever and node form well understood by those skilled in the art, and includes a sun gear member 262, also represented with an S, a ring gear member 264, also represented with an R, and a carrier member 266, also represented with a C, that rotatably supports pinion gears intermeshing with both the sun gear member 262 and the ring gear member 264. The sun gear member 262 is continuously grounded to the stationary member 238. The ring gear member 264 is connected for rotation with the rotor of the motor/generator 236 by engagement of the torque-transmitting mechanism 258, which is a rotating-type clutch. The carrier member 266 is continuously connected for rotation with a carrier of the differential 220 of the front axle assembly 218 via a connecting member 280, such as a propeller shaft. The front axles 222, 224 are connected with side gears of the differential 220 that mesh with a pinion supported for rotation on the differential carrier, as is typical of differentials and is understood by those skilled in the art. Other types of planetary gear sets, such as a compound planetary gear set, may be used in lieu of a simple planetary gear set 260, depending on the desired gear ratio between the motor/generator 236, engine 234 and front axle assembly 218.

The second planetary gear set 270 is a simple planetary gear set, also shown in the lever and node form well understood by those skilled in the art, and includes a sun gear member 272, also represented with an S, a ring gear member 274, also represented with an R, and a carrier member 276, also represented with a C, that rotatably supports pinion gears intermeshing with both the sun gear member 272 and the ring gear member 274. The sun gear member 272 is selectively grounded to the stationary member 238 by engagement of torque-transmitting mechanism 256, which is a stationary-type clutch, also referred to as a brake. The sun gear member 272 is selectively connected for common rotation with the rotor of the motor/generator 236 by engagement of the torque-transmitting mechanism 254, which is a rotating-type clutch, referred to as a clutch. The carrier member 276 is selectively connected for rotation with the engine 234 by engagement of the torque-transmitting mechanism 250, which is a rotating-type clutch. The carrier member 276 is selectively grounded to the stationary member 238 by engagement of the torque-transmitting mechanism 252, which is a stationary-type clutch. The ring gear member 274 is continuously connected for rotation with a carrier of the differential 228 of the rear axle assembly 226 via a connecting member 282, such as a propeller shaft. The rear axles 230, 232 are connected with side gears of the differential 228 that mesh with a pinion supported for rotation on the differential carrier, as is typical of differentials and is understood by those skilled in the art.

Referring to FIG. 5, the torque-transmitting mechanisms 250, 252, 254, 256 and 258 are engagable in different combinations, along with different operating states of the engine 234 and motor/generator 236 to provide various operating modes. First, the vehicle 210 may be launched in an electric-only mode (also referred to as E-Launch/ZEV Mode, or as front electric drive mode) by engaging torque-transmitting mechanism 258 and controlling the motor/generator 236 to function as a motor. The engine 234 is off in the electric-only mode. The motor/generator 236 thus provides torque to the front wheels 214 through the planetary gear set 260 and front axle assembly 218.

Referring again to FIG. 5, the vehicle 210 may be shifted from the electric-only mode to an input-split operating mode by engaging torque-transmitting mechanism 250 and 254 while simultaneously disengaging torque-transmitting mechanism 258. In the input-split operating mode, which is rear drive, when accelerating, the engine 234 provides torque to the carrier member 276, and the motor/generator 236 is controlled to function as a motor to provide torque to the sun gear member 272 or function as a generator.

To cruise at a constant, relatively low vehicle speed (e.g., between 25 and 45 mph), referred to as $CRUISE_{LOSPD,R}$ in FIG. 5, the controller 242 monitors speed of wheels 214, 216, and operates either in the input-split mode or in an engine-only mode. In the input-split mode, when cruising, the torque-transmitting mechanisms 250 and 254 are engaged, and the motor/generator 236 is controlled to function either as a motor or as a generator, to maintain a desired cruising speed, with the engine 234 able to operate at its most efficient speed. In the engine-only mode, torque-transmitting mechanism 250 and torque-transmitting mechanism 256 are engaged, to ground the sun gear member 272 to the stationary member 238, so that only the engine 234 is providing torque, and the motor/generator 236 is disconnected from the rear axle assembly 226.

To cruise at a constant, relatively high vehicle speed (e.g., above 45 mph), referred to as $CRUISE_{HISPD,R}$ in FIG. 5, torque-transmitting mechanism 250 remains engaged and the engine-only mode is established by also engaging torque-transmitting mechanism 256 while torque-transmitting mechanism 254 is disengaged. Speed of motor/generator 236 is zero, and the speed of the wheels 214, 216 and the rear connecting member 282 increase proportionately with increasing engine speed.

Two regenerative braking modes are provided. For regeneration of rear axle torque during front-drive modes, referred to as $BRAKING_R$ in FIG. 5, such as during the cruising modes, the torque-transmitting mechanism 254 is engaged to connect the connect the sun gear member 272 for rotation with the motor/generator 236, which is controlled to operate as a generator, converting torque at the sun gear member 272 to stored electrical energy in the energy storage device 240. Either but not both of torque-transmitting mechanisms 250 and 252 is engaged. If torque-transmitting mechanism 250 is engaged, engine torque is still provided to the carrier 276, and may be regenerated by the motor/generator as energy stored in the electric storage device 240, to slow the wheels 216 via connecting member 282.

For regeneration of front axle torque, referred to as $BRAKING_F$ in FIG. 5, such as during the electric-only, front drive mode, either of torque-transmitting mechanisms 250 and 252 is engaged as discussed above, torque-transmitting mechanism 258 is engaged, and the motor/generator 236 is controlled to function as a generator, converting torque of the front axle assembly 218 provided at the ring gear member 264 to stored electrical energy in the energy storage device 240.

Third Embodiment

Figures 6, 7:
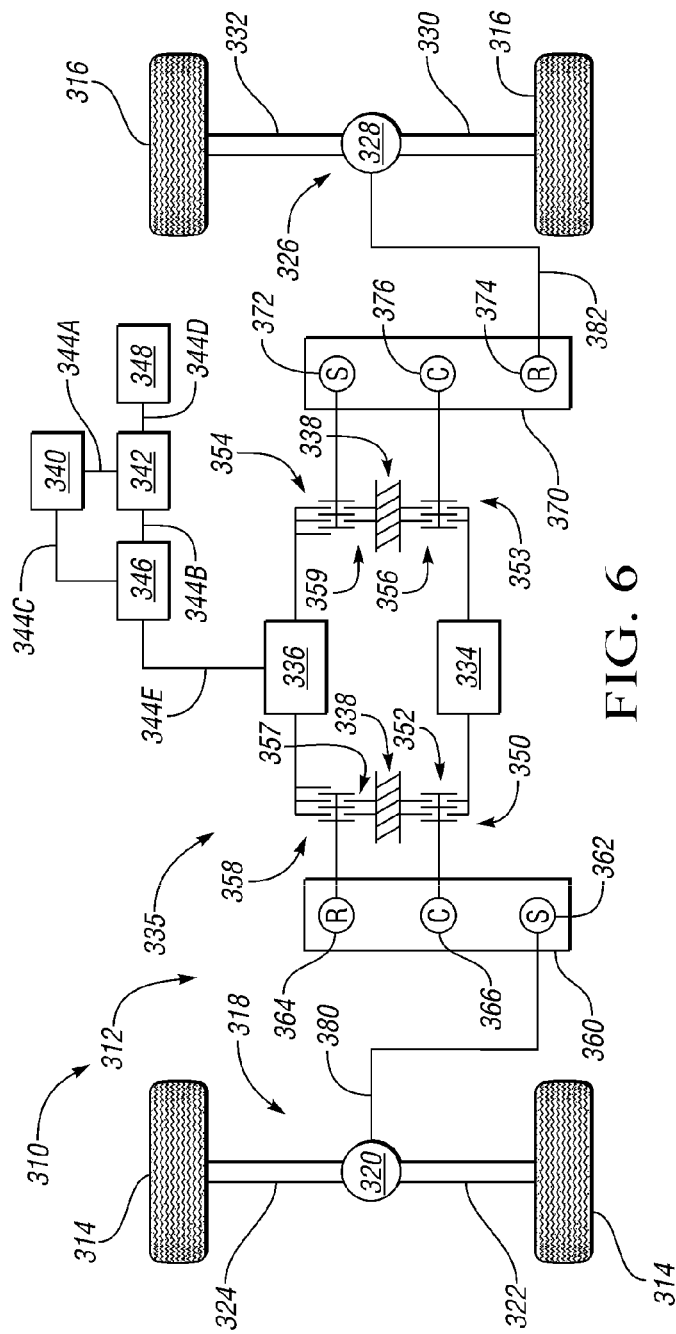
FIG. 6 is a schematic illustration of a third embodiment of a hybrid vehicle with a third embodiment of a hybrid powertrain.
FIG. 7 is a table indicating the engagement status of torque-transmitting mechanisms in the powertrain of FIG. 6 in various operating modes.

FIG. 6 shows a hybrid vehicle 310 having a hybrid powertrain 312 for delivering power to front wheels 314 and rear wheels 316 of the vehicle 310, as described herein. The vehicle 310 has a front axle assembly 318 including a differential 320 connected with first and second front axles 322, 324 that are each attached with a respective one of the wheels 314. Similarly, the vehicle has a rear axle assembly 326 including a differential 328 connected with first and second rear axles 330, 332 that are each attached with a respective one of the wheels 316.

The powertrain 312 includes an engine 334, such as an internal combustion or diesel engine, as well as a transmission 335 that includes a single motor/generator 336. The motor/generator 336 is represented schematically, and includes a stator portion as well as a rotor portion. The stator portion is grounded to a stationary member, such as a casing 338 of the transmission 335. The casing 338 is shown only in fragmented form attached with various torque-transmitting mechanisms, discussed below. The rotor portion is selectively connectable to the planetary gear sets 360, 370, as described below. Those skilled in the art will readily understand the construction and function of stators and rotors.

The transmission 335 selectively receives torque from the engine 334. The hybrid transmission 335 also receives torque from the motor/generator 336, which in turn is powered by an electric storage device 340. If the motor/generator 336 is controlled to function as a generator, torque from the transmission 335 is converted to electric energy stored in the electric storage device 340. The electric storage device 340 may be one or more batteries but will be referred to herein as a battery. Other electric storage devices that have the ability to store electric power and dispense electric power may be used in place of the batteries.

The electric storage device 340 communicates with an electronic controller 342 by transfer conductor 344A. The controller 342 communicates with a power inverter 346 by transfer conductor 344B. The power inverter 346 in turn communicates with the electric storage device 340 via transfer conductor 344C. Transfer conductor 344E allows the power inverter 346 to provide the stored electric power to the motor/generator 336 in a motor mode, or transfer electric power from the motor/generator 336 to the electric storage device 340 in a generator mode. Additionally, the controller 342 communicates with a valve body 348 via transfer conductor 344D to control selective engagement or disengagement of torque transmitting devices 350, 352, 353, 354, 356, 357, 358, and 359, described below, via hydraulic fluid pressure, as is understood by those skilled in the art. Selective engagement of the torque-transmitting mechanisms 350, 352, 353, 354, 356, 357, 358, and 359 along with control of the speed and torque of the motor/generator 336 and engine 334 determines the operating mode of the powertrain 312.

Sensors, not shown, may be operatively connected with the torque transmitting mechanisms 350, 352, 353, 354, 356, 357, 358, and 359, as well as the engine 334 and the motor/generator 336 to provide, via transfer conductor not shown, sensed characteristics to the controller 342, such as temperature, torque load and relative speed of clutch plates.

The powertrain 312 further includes a first planetary gear set 360 and a second planetary gear set 370. The first planetary gear set 360 is a simple planetary gear set, shown in a lever and node form well understood by those skilled in the art, and includes a sun gear member 362, also represented with an S, a ring gear member 364, also represented with an R, and a carrier member 366, also represented with a C, that rotatably supports pinion gears intermeshing with both the sun gear member 362 and the ring gear member 364. The sun gear member 362 is continuously connected for rotation with a carrier of the differential 320 of the front axle assembly 318 via a connecting member 380, such as a propeller shaft. The ring gear member 364 is connected for rotation with the rotor of the motor/generator 336 by engagement of the torque-transmitting mechanism 358, which is a rotating-type clutch. The ring gear member 364 is grounded to the stationary member 338 by engagement of the torque-transmitting mechanism 357, which is a stationary-type clutch. The carrier member 366 is connected for rotation with engine 334 by engagement of torque-transmitting mechanism 350, which is a rotating-type clutch. The carrier member 366 is grounded to the stationary member 338 by engagement of torque-transmitting mechanism 352, which is a stationary-type clutch. The front axles 322, 324 are connected with side gears of the differential 320 that mesh with a pinion supported for rotation on the differential carrier, as is typical of differentials and is understood by those skilled in the art. Other types of planetary gear sets, such as a compound planetary gear set, may be used in lieu of a simple planetary gear set 360, depending on the desired gear ratio between the motor/generator 336, engine 334 and front axle assembly 318.

The second planetary gear set 370 is a simple planetary gear set, also shown in the lever and node form well understood by those skilled in the art, and includes a sun gear member 372, also represented with an S, a ring gear member 374, also represented with an R, and a carrier member 376, also represented with a C, that rotatably supports pinion gears intermeshing with both the sun gear member 372 and the ring gear member 374. The sun gear member 372 is selectively grounded to the stationary member 338 by engagement of torque-transmitting mechanism 359, which is a stationary-type clutch, also referred to as a brake. The sun gear member 372 is selectively connected for common rotation with the rotor of the motor/generator 336 by engagement of the torque-transmitting mechanism 354, which is a rotating-type clutch, referred to as a clutch. The carrier member 376 is selectively connected for rotation with the engine 334 by engagement of the torque-transmitting mechanism 353, which is a rotating-type clutch. The carrier member 376 is selectively grounded to the stationary member 338 by engagement of the torque-transmitting mechanism 356, which is a stationary-type clutch. The ring gear member 374 is continuously connected for rotation with a carrier of the differential 328 of the rear axle assembly 326 via a connecting member 382, such as a propeller shaft. The rear axles 330, 332 are connected with side gears of the differential 328 that mesh with a pinion supported for rotation on the differential carrier, as is typical of differentials and is understood by those skilled in the art.

Referring to FIG. 7, the torque-transmitting mechanisms 350, 352, 353, 354, 356, 357, 358 and 359 are engagable in different combinations, along with different operating states of the engine 334 and motor/generator 336 to provide various operating modes. First, the vehicle 310 may be launched in an electric-only mode (also referred to as E-LAUNCH, or as rear electric drive mode) by engaging torque-transmitting mechanisms 356 and 354 and controlling the motor/generator 336 to function as a motor. The engine 334 is off in the electric-only mode. The motor/generator 336 thus provides torque to the rear wheels 316 through the planetary gear set 370 and rear axle assembly 326.

Referring again to FIG. 7, the vehicle 310 may be shifted from the electric-only mode to cruise at a constant, relatively low vehicle speed (e.g., between 25 and 45 mph), referred to as $\text{CRUISE}_{LOSPD,F}$ in FIG. 7. The controller 342 monitors speed of wheels 314, 316, and the torque-transmitting mechanisms 350 and 358 are engaged so that torque of the engine 334 is provided to front axle assembly 318 and torque is provided from motor/generator 336 to front axle assembly 318 or provided from front axle assembly 318 to motor/generator 336. The motor/generator 336 is controlled to function either as a motor or as a generator, to maintain a desired cruising speed, with the engine 334 able to operate at its most efficient speed.

The vehicle 310 may be shifted from the electric-only mode to cruise at a constant, relatively low vehicle speed (e.g., between 25 and 45 mph), referred to as $\text{CRUISE}_{LOSPD,R}$ in FIG. 7. The controller 342 monitors speed of wheels 314, 316, and the torque-transmitting mechanisms 353 and 354 are engaged, so that torque of the engine 334 is provided to rear axle assembly 326 and torque is provided to motor/generator 336 from rear axle assembly 326 or provided from rear axle assembly 326 to motor/generator 336. The motor/generator 336 is controlled to function either as a motor or as a generator, to maintain a desired cruising speed, with the engine 334 able to operate at its most efficient speed.

To cruise at a constant, relatively high vehicle speed (e.g., above 45 mph), referred to as $\text{CRUISE}_{HISPD,R}$ in FIG. 7, if shifting from $\text{CRUISE}_{LOSPD,R}$, torque-transmitting mechanism 353 remains engaged and the engine-only mode is established by also engaging torque-transmitting mechanism 359 while torque-transmitting mechanism 354 is disengaged. The engine 334 provides torque to the rear wheels 316 via the planetary gear set 370.

To cruise at a constant, relatively high vehicle speed (e.g., above 45 mph), referred to as $\text{CRUISE}_{HISPD,F}$ in FIG. 7, if shifting from $\text{CRUISE}_{LOSPD,F}$, torque-transmitting mechanism 350 remains engaged and the engine-only mode is established by also engaging torque-transmitting mechanism 357 while torque-transmitting mechanism 358 is disengaged. The engine 334 provides torque to the front wheels 314 via the planetary gear set 360.

Fourth Embodiment

FIG. 8 shows a hybrid vehicle 410 having a hybrid powertrain 412 for delivering power to front wheels 414 and rear wheels 416 of the vehicle 410, as described herein. The vehicle 410 has a front axle assembly 418 including a differential 420 connected with first and second front axles 422, 424 that are each attached with a respective one of the wheels 414.

Similarly, the vehicle has a rear axle assembly 426 including a differential 428 connected with first and second rear axles 430, 432 that are each attached with a respective one of the wheels 416.

The powertrain 412 includes an engine 434, such as an internal combustion or diesel engine, as well as a transmission 435 that includes a first motor/generator 436 and a second motor/generator 437. The motor/generator 436 is represented schematically, and includes a stator portion as well as a rotor portion. The stator portion is grounded to a stationary member, such as a casing 438 of the transmission 435. The casing 438 is shown only in fragmented form attached with various torque-transmitting mechanisms, discussed below. The rotor portion is continuously connected with ring gear member 464 of planetary gear set 460. Motor/generator 437 also includes a rotor portion connected for rotation with sun gear member 472 of planetary gear set 470, and a stator portion grounded to the stationary member 438. Those skilled in the art will readily understand the construction and function of stators and rotors.

The transmission 435 selectively receives torque from the engine 434. The hybrid transmission 435 also receives torque from the motor/generator 436 and/or from the motor/generator 437, which in turn are powered by an electric storage device 440. If the motor/generator 436 or the motor/generator 437 is controlled to function as a generator, torque from the transmission 435 is converted to electric energy stored in the electric storage device 440. The electric storage device 440 may be one or more batteries but will be referred to herein as a battery. Other electric storage devices that have the ability to store electric power and dispense electric power may be used in place of the batteries.

The electric storage device 440 communicates with an electronic controller 442 by transfer conductor 444A. The controller 442 communicates with a power inverter 446 by transfer conductor 444B. The power inverter 446 in turn communicates with the electric storage device 440 via transfer conductor 444C. Transfer conductor 444E allows the power inverter 446 to provide the stored electric power to the motor/generator 436 in a motor mode, or transfer electric power from the motor/generator 436 to the electric storage device 440 in a generator mode. Transfer conductor 444F allows the power inverter 446 to provide the stored electric power to the motor/generator 437 in a motor mode, or transfer electric power from the motor/generator 437 to the electric storage device 440 in a generator mode. Additionally, the controller 442 communicates with a valve body 448 via transfer conductor 444D to control selective engagement or disengagement of torque transmitting devices 450, 452, 453 and 456, described below, via hydraulic fluid pressure, as is understood by those skilled in the art. Selective engagement of the torque-transmitting mechanisms 450, 452, 453, 456, along with control of the speed and torque of the motor/generators 436, 437 and engine 434 determines the operating mode of the powertrain 412.

Sensors, not shown, may be operatively connected with the torque transmitting mechanisms 450, 452, 453, and 456, as well as the engine 434 and the motor/generators 436, 437 to provide, via transfer conductor not shown, sensed characteristics to the controller 442, such as temperature, torque load and relative speed of clutch plates.

The powertrain 412 further includes a first planetary gear set 460 and a second planetary gear set 470. The first planetary gear set 460 is a simple planetary gear set, shown in a lever and node form well understood by those skilled in the art, and includes a sun gear member 462, also represented with an S, a ring gear member 464, also represented with an R, and a carrier member 466, also represented with a C, that rotatably supports pinion gears intermeshing with both the sun gear member 462 and the ring gear member 464. The sun gear member 462 is is continuously connected for rotation with a carrier of the differential 420 of the front axle assembly 418 via a connecting member 480, such as a propeller shaft. The ring gear member 464 is continuously connected for rotation with the rotor of the motor/generator 436. The carrier member 466 is selectively connected for rotation with engine 434 by engagement of torque-transmitting mechanism 450, which is a rotating-type clutch. The carrier member 466 is grounded to the stationary member 438 by engagement of torque-transmitting mechanism 452, which is a stationary-type clutch. The front axles 422, 424 are connected with side gears of the differential 420 that mesh with a pinion supported for rotation on the differential carrier, as is typical of differentials and is understood by those skilled in the art. Other types of planetary gear sets, such as a compound planetary gear set, may be used in lieu of a simple planetary gear set 460, depending on the desired gear ratio between the motor/generator 436, engine 434 and front axle assembly 418.

The second planetary gear set 470 is a simple planetary gear set, also shown in the lever and node form well understood by those skilled in the art, and includes a sun gear member 472, also represented with an S, a ring gear member 474, also represented with an R, and a carrier member 476, also represented with a C, that rotatably supports pinion gears intermeshing with both the sun gear member 472 and the ring gear member 474. The sun gear member 472 is continuously connected for rotation with the rotor of motor/generator 437. The carrier member 476 is selectively connected for rotation with the engine 434 by engagement of the torque-transmitting mechanism 453, which is a rotating-type clutch. The carrier member 476 is selectively grounded to the stationary member 438 by engagement of torque-transmitting mechanism 456, which is a stationary-type clutch, also referred to as a brake. The ring gear member 474 is continuously connected for rotation with a carrier of the differential 428 of the rear axle assembly 426 via a connecting member 482, such as a propeller shaft. The rear axles 430, 432 are connected with side gears of the differential 428 that mesh with a pinion supported for rotation on the differential carrier, as is typical of differentials and is understood by those skilled in the art.

Referring to FIG. 9, the torque-transmitting mechanisms 450, 452, 453 and 456 are engagable in different combinations, along with different operating states of the engine 434 and motor/generators 436, 437 to provide various operating modes. First, the vehicle 410 may be launched in an electric-only mode (also referred to as E-LAUNCH) by engaging torque-transmitting mechanisms 452 and 456 and controlling the motor/generators 436, 437 to function as motors. The engine 434 is off in the electric-only mode. The motor/generator 436 thus provides torque to the front wheels 414 through the planetary gear set 460 and front axle assembly 418, and the motor/generator 437 provides torque to the rear wheels 316 through the planetary gear set 472 and rear axle assembly 426. The use of two motor/generators 436, 437 allows the engine speed to be maintained at an optimum efficiency speed over a wider range of vehicle speeds during the various CRUISE modes described below.

Referring again to FIG. 9, the vehicle 410 may be shifted from the electric-only mode to cruise in a four wheel-drive mode with the engine operatively connected to the front drive assembly 418, referred to as CRUISE$_{4WF}$ in FIG. 9. Drive torque is provided to all four wheels 414, 416 in this operating mode. The controller 442 monitors speed of wheels 414, 416, and the torque-transmitting mechanism 450 is engaged, torque-transmitting mechanism 456 remains engaged, and torque-transmitting mechanism 452 is disengaged, so that torque of the engine 434 is provided to front axle assembly 418. Torque may also be provided to front axle assembly 418 from motor/generator 436 or provided from front axle assembly 418 to motor/generator 436. Torque may be provided to motor/generator 437 from rear axle assembly 426 or provided from rear axle assembly 426 to motor/generator 437. The motor/generators 436, 437 are each controlled to function either as a motor or as a generator, to maintain a desired cruising speed, with the engine 434 able to operate at its most efficient speed.

The vehicle 410 may be shifted from the electric-only mode to cruise in a four wheel-drive mode with the engine operatively connected to the rear drive assembly 426, referred to as CRUISE$_{4WR}$ in FIG. 9. Drive torque is provided to all four wheels 414, 416 in this operating mode. The controller 442 monitors speed of wheels 414, 416, torque-transmitting mechanism 453 is engaged, torque-transmitting mechanism 452 remains engaged, and torque-transmitting mechanism 456 is disengaged, so that torque of the engine 434 is provided to rear axle assembly 426. Torque may also be provided to rear axle assembly 426 from motor/generator 437 or provided from rear axle assembly 426 to motor/generator 437. Torque may be provided to motor/generator 436 from front axle assembly 418 or provided from front axle assembly 418 to motor/generator 436. The motor/generators 436, 437 are each controlled to function either as a motor or as a generator, to maintain a desired cruising speed, with the engine 434 able to operate at its most efficient speed.

Referring again to FIG. 9, the vehicle 410 may be shifted from the electric-only mode to cruise in a front wheel-drive mode with the engine operatively connected to the front drive assembly 418, referred to as CRUISE$_F$ in FIG. 9. Drive torque is provided to front wheels 414 in this operating mode. The controller 442 monitors speed of wheels 414, 416, and the torque-transmitting mechanism 450 is engaged while torque-transmitting mechanisms 452, 456 are disengaged, so that torque of the engine 434 is provided to front axle assembly 418. Torque may also be provided to front axle assembly 418 from motor/generator 436 or provided from front axle assembly 418 to motor/generator 436. The motor/generator 436 is controlled to function either as a motor or as a generator, to maintain a desired cruising speed, with the engine 434 able to operate at its most efficient speed.

Referring again to FIG. 9, the vehicle 410 may be shifted from the electric-only mode to cruise in a rear wheel-drive mode with the engine operatively connected to the rear drive assembly 426, referred to as CRUISE$_R$ in FIG. 9. Drive torque is provided to rear wheels 416 in this operating mode. The controller 442 monitors speed of wheels 414, 416, and the torque-transmitting mechanism 453 is engaged while torque-transmitting mechanisms 452, 456 are disengaged, so that torque of the engine 434 is provided to rear axle assembly 426. Torque may also be provided to rear axle assembly 426 from motor/generator 437 or provided from rear axle assembly 426 to motor/generator 437. The motor/generator 437 is controlled to function either as a motor or as a generator, to maintain a desired cruising speed, with the engine 434 able to operate at its most efficient speed.

A regenerative braking mode is provided that permits regeneration of both front and rear axle torque, referred to as BRAKING or DBL REGEN in FIG. 9. As in the electric-only operating mode, torque-transmitting mechanisms 452, 456 are engaged. Both carrier members 466, 476 are thus grounded to the stationary member 438, and torque is provided to the motor/generators 436, 437 through the respective planetary gear sets 460, 470. The motor/generators 436, 437 are controlled to operate as generators, converting torque at the ring gear member 464 and at the sun gear member 472, respectively, to stored electrical energy in the energy storage device 440.

While the best modes for carrying out the invention have been described in detail, those familiar with the art to which this invention relates will recognize various alternative designs and embodiments for practicing the invention within the scope of the appended claims.

The invention claimed is:

1. A hybrid vehicle having front and rear wheels, comprising:
    a front drive axle assembly continuously connected with the front wheels;
    a rear drive axle assembly continuously connected with the rear wheels;
    an engine;
    a transmission having:
    a motor/generator;
    a stationary member;
    a planetary gear set having a ring gear member, a sun gear member, and a carrier member, at least one of the members of the planetary gear set being continuously connected to one of said axle assemblies; and
    a plurality of selectively engagable torque-transmitting mechanisms;
    wherein said engine and said motor/generator are separately selectively directly connectable to a respective different one of said members of said planetary gear set by engagement of a respective different one of said torque-transmitting mechanisms to transfer torque to said one of said drive axle assemblies; and
    wherein at least one of said engine and said motor/generator is selectively connectable to the other of said drive axle assemblies by engagement of another one of said torque-transmitting mechanisms to transfer torque to the other of said drive axle assemblies.

2. The hybrid vehicle of claim 1, further comprising:
    a controller operatively connected to the motor/generator, to the engine and to the torque-transmitting mechanisms; wherein the controller is operable to cause engagement of at least one of the torque-transmitting mechanisms and simultaneous disengagement of at least one other of the torque-transmitting mechanisms to switch the vehicle from an electric-only operating mode to a hybrid operating mode without a change in motor/generator speed due to the shift.

3. The hybrid vehicle of claim 1, wherein the motor/generator is separately selectively directly connectable to the sun gear member of the first planetary gear set and to the rear drive axle assembly, the engine is selectively directly connectable to the carrier member of the first planetary gear set, and the front drive axle assembly is directly connected to the ring gear member of the first planetary gear set.

4. The hybrid vehicle of claim 1, wherein the planetary gear set is a first planetary gear set; and further comprising:
   a second simple planetary gear set having a ring gear member, a carrier member and a sun gear member, at least one of the members of the second planetary gear set being continuously connected to the other of the drive axle assemblies; wherein neither the motor/generator nor the engine is continuously connected to either of the planetary gear sets.

5. The hybrid vehicle of claim 4, wherein the motor/generator is separately selectively directly connectable to the sun gear member of the first planetary gear set and to the carrier member of the second planetary gear set, the engine is selectively directly connectable to the carrier member of the first planetary gear set, the front drive axle assembly is directly connected to the ring gear member of the first planetary gear set, the rear drive axle assembly is directly connected to the ring gear member of the second planetary gear set, and the sun gear member of the second planetary gear set is directly connected to the stationary member.

6. The hybrid vehicle of claim 4, wherein the motor/generator is separately selectively connectable to the ring gear member of the first planetary gear set and to the sun gear member of the second planetary gear set, the engine is selectively connectable to the carrier member of the second planetary gear set, the front drive axle assembly is connected to the carrier member of the first planetary gear set, and the rear drive axle assembly is connected to the ring gear member of the second planetary gear set.

7. The hybrid vehicle of claim 4, wherein the motor/generator is separately selectively connectable to the ring gear member of the first planetary gear set and to the sun gear member of the second planetary gear set, the engine is separately selectively connectable to the carrier member of the first planetary gear set and to the carrier member of the second planetary gear set, the front drive axle assembly is connected to the sun gear member of the first planetary gear set, and the rear drive axle assembly is connected to the ring gear member of the second planetary gear set.

8. The hybrid vehicle of claim 4, wherein the motor/generator is a first motor/generator and is continuously connected to the ring gear member of the first planetary gear set, and further comprising:
   a second motor/generator continuously connected to the sun gear member of the second planetary gear set;
   wherein the engine is separately selectively connectable to the carrier member of the first planetary gear set and to the carrier member of the second planetary gear set, the front drive axle assembly is connected to the sun gear member of the first planetary gear set, and the rear drive axle assembly is connected to the ring gear member of the second planetary gear set.

9. The hybrid vehicle of claim 1, wherein the powertrain is configured to provide an electric-only operating mode, at least one electrically-variable operating mode, an engine-only mode, and a regenerative braking mode.

10. A hybrid powertrain for a vehicle having a front axle assembly connected with front wheels and a rear axle assembly connected with rear wheels comprising:
    an engine;
    a transmission having:
      a simple planetary gear set with a sun gear member, a carrier member and a ring gear member;
      a motor/generator;
      a stationary member; and
      a plurality of selectively engagable torque-transmitting mechanisms each engagable to directly connect one of the engine and the motor/generator with one of the members of the planetary gear set for common rotation, or to directly connect one of the members of the planetary gear set with the stationary member;
    said planetary gear set having one of said members continuously directly connected for delivering torque to one of said front axle assembly and said rear axle assembly;
    wherein at least one of said engine and said motor/generator is alternately operatively connectable to said front axle assembly and said rear axle assembly by engagement of different ones of said torque-transmitting mechanisms for delivering torque to or receiving torque from said front axle assembly and said rear axle assembly, respectively; and
    wherein the torque-transmitting mechanisms are engagable in different combinations to provide different operating modes including an electric-only operating mode, and at least one electrically-variable operating mode.

11. The powertrain of claim 10, further comprising a controller operatively connected to the motor/generator, the engine and the torque-transmitting mechanisms, and wherein the controller is operable to cause engagement of at least one of the torque-transmitting mechanisms and simultaneous disengagement of at least one other of the torque-transmitting mechanisms to switch the vehicle from an electric-only operating mode to a hybrid operating mode without a change in motor/generator speed due to the shift.

12. The powertrain of claim 10, wherein the motor/generator is separately selectively directly connectable to the sun gear member of the first planetary gear set and to the rear axle assembly, the engine is selectively directly connectable to the carrier member of the first planetary gear set, and the front axle assembly is directly connected to the ring gear member of the first planetary gear set.

13. The powertrain of claim 10, wherein the planetary gear set is a first planetary gear set; and further comprising:
    a second simple planetary gear set having a ring gear member, a carrier member and a sun gear member, at least one of the members of the second planetary gear set being continuously connected to the other of the axle assemblies; wherein neither the motor/generator nor the engine is continuously connected to either of the planetary gear sets.

14. The powertrain of claim 13, wherein the motor/generator is separately selectively directly connectable to the sun gear member of the first planetary gear set and to the carrier member of the second planetary gear set, the engine is selectively directly connectable to the carrier member of the first planetary gear set, the front axle assembly is directly connected to the ring gear member of the first planetary gear set, and the rear axle assembly is directly connected to the ring gear member of the second planetary gear set, and the sun gear member of the second planetary gear set is directly connected to the stationary member.

15. The powertrain of claim 13, wherein the motor/generator is separately selectively connectable to the ring gear member of the first planetary gear set and to the sun gear member of the second planetary gear set, the engine is selectively connectable to the carrier member of the second planetary gear set, the front axle assembly is connected to the carrier member of the first planetary gear set, and the rear axle assembly is connected to the ring gear member of the second planetary gear set.

16. The powertrain of claim 13, wherein the motor/generator is separately selectively connectable to the ring gear member of the first planetary gear set and to the sun gear member of the second planetary gear set, the engine is separately selectively connectable to the carrier member of the first planetary gear set and to the carrier member of the second planetary gear set, the front axle assembly is connected to the sun gear member of the first planetary gear set, and the rear axle assembly is connected to the ring gear member of the second planetary gear set.

17. The powertrain of claim 13, wherein the motor/generator is a first motor/generator and is continuously connected to the ring gear member of the first planetary gear set, and further comprising:
- a second motor/generator continuously connected to the sun gear member of the second planetary gear set;
- wherein the engine is separately selectively connectable to the carrier member of the first planetary gear set and to the carrier member of the second planetary gear set, the front axle assembly is connected to the sun gear member of the first planetary gear set, and the rear axle assembly is connected to the ring gear member of the second planetary gear set.

18. The powertrain of claim 13, wherein the powertrain is configured to provide an electric-only operating mode, at least one electrically-variable operating mode, an engine-only mode, and a regenerative braking mode.

19. A hybrid vehicle comprising:
- a front drive axle assembly;
- a rear drive axle assembly;
- an engine;
- a transmission having:
- a motor/generator;
- a stationary member;
- a first and a second simple planetary gear set each having a ring gear member, a sun gear member, and a carrier member, at least one of the members of each planetary gear set being directly connected to a different one of said drive axle assemblies, respectively; and
- a plurality of selectively engagable torque-transmitting mechanisms;
- wherein said engine and said motor/generator are separately selectively connectable to one of said planetary gear sets by engagement of different ones of said torque-transmitting mechanisms to transfer torque to said drive axle assembly connected with said one of said planetary gear sets; wherein the transmission is characterized by the absence of any additional motor/generator operable to transfer torque to any of the drive assemblies;
- wherein said motor/generator is selectively directly connectable to the other of said planetary gear sets by engagement of another one of said torque-transmitting mechanisms to transfer torque to the said drive axle assembly connected with said other of said planetary gear sets; and
- wherein said motor/generator is not continuously connected to any of said members of any of said planetary gear sets.

* * * * *